(12) United States Patent
Pathakis et al.

(10) Patent No.: US 7,770,204 B2
(45) Date of Patent: Aug. 3, 2010

(54) TECHNIQUES FOR SECURING ELECTRONIC IDENTITIES

(75) Inventors: Scott William Pathakis, Sandy, UT (US); David Kent Beus, Highland, UT (US); Stephen R Carter, Spanish Fork, UT (US); Michael William Cook, Orem, UT (US); Howard Rollin Davis, Salem, UT (US); Dustin Lance Nielson, Salt Lake City, UT (US); David Nephi Johnson, Provo, UT (US); Jerry E Griffis, Lehi, UT (US)

(73) Assignee: Novell, Inc., Provo, UT (US)

( * ) Notice: Subject to any disclaimer, the term of this patent is extended or adjusted under 35 U.S.C. 154(b) by 1129 days.

(21) Appl. No.: 10/676,138

(22) Filed: Sep. 30, 2003

(65) Prior Publication Data

US 2005/0071687 A1    Mar. 31, 2005

(51) Int. Cl.
G06F 7/04    (2006.01)
G06F 17/30    (2006.01)

(52) U.S. Cl. ............... 726/2; 726/27; 380/247; 709/225; 711/147; 713/155; 713/156; 713/157; 713/158; 713/159

(58) Field of Classification Search ......... 726/2
See application file for complete search history.

(56) References Cited

U.S. PATENT DOCUMENTS

| | | | | |
|---|---|---|---|---|
| 4,679,236 | A | | 7/1987 | Davies ............ 713/184 |
| 4,819,267 | A | | 4/1989 | Cargile ............ 713/184 |
| 4,926,481 | A | | 5/1990 | Collins ............ 713/184 |
| 5,060,263 | A | | 10/1991 | Bosen et al. ......... 713/184 |
| 5,163,097 | A | | 11/1992 | Pegg ............... 713/183 |
| 5,588,056 | A | | 12/1996 | Ganesan ........... 713/183 |
| 5,649,185 | A | * | 7/1997 | Antognini et al. ......... 1/1 |
| 5,961,593 | A | * | 10/1999 | Gabber et al. ........... 709/219 |
| 6,148,406 | A | | 11/2000 | Weisz .............. 713/202 |
| 6,286,002 | B1 | * | 9/2001 | Axaopoulos et al. ......... 1/1 |
| 6,373,949 | B1 | * | 4/2002 | Aura .............. 380/247 |
| 6,405,318 | B1 | * | 6/2002 | Rowland ............ 726/22 |
| 6,418,472 | B1 | * | 7/2002 | Mi et al. ............ 709/229 |
| 6,453,342 | B1 | * | 9/2002 | Himmel et al. .......... 709/213 |
| 6,463,055 | B1 | * | 10/2002 | Lupien et al. ........... 370/353 |
| 6,647,494 | B1 | * | 11/2003 | Drews .............. 713/170 |
| 6,868,448 | B1 | * | 3/2005 | Gupta et al. .......... 709/226 |
| 6,975,581 | B1 | * | 12/2005 | Medina et al. ......... 370/401 |

(Continued)

FOREIGN PATENT DOCUMENTS

WO    WO-03023643 A1    3/2003

(Continued)

*Primary Examiner*—Farid Homayounmehr
(74) *Attorney, Agent, or Firm*—Schwegman, Lundberg & Woessner, P.A.

(57) ABSTRACT

Methods, systems, and data stores generate and manage temporarily assigned identities. A requestor issues a request for a service. The request includes an identity used for authenticating the requestor. The identity is used for generating an identity configuration and for generating a temporarily assigned identity that is updated to a protected identity directory. The request and the temporarily assigned identity are transmitted to the service. The service uses the temporarily assigned identity to access the protected identity directory for purposes of authenticating the request. The service uses the authenticated request to access attributes associated with the temporarily assigned identity.

22 Claims, 4 Drawing Sheets

U.S. PATENT DOCUMENTS

| | | | |
|---|---|---|---|
| 7,085,840 B2 * | 8/2006 | de Jong et al. | 709/229 |
| 7,096,490 B2 * | 8/2006 | Xiong et al. | 726/3 |
| 7,120,797 B2 * | 10/2006 | Wheeler | 713/176 |
| 7,171,555 B1 * | 1/2007 | Salowey et al. | 713/156 |
| 7,339,908 B2 * | 3/2008 | Uhlik et al. | 370/331 |
| 7,624,421 B2 * | 11/2009 | Ozzie et al. | 726/1 |
| 2001/0034718 A1 * | 10/2001 | Shaked et al. | 705/64 |
| 2002/0032649 A1 * | 3/2002 | Selvarajan | 705/40 |
| 2003/0009593 A1 * | 1/2003 | Apte | 709/245 |
| 2003/0140225 A1 * | 7/2003 | Banks et al. | 713/155 |
| 2004/0083184 A1 * | 4/2004 | Tsuei et al. | 705/74 |
| 2004/0260953 A1 * | 12/2004 | Jamieson et al. | 713/202 |
| 2005/0154913 A1 * | 7/2005 | Barriga et al. | 713/201 |
| 2006/0023882 A1 * | 2/2006 | Salkintzis | 380/247 |
| 2007/0180229 A1 * | 8/2007 | Salowey et al. | 713/156 |
| 2008/0098457 A1 * | 4/2008 | Carter | 726/2 |
| 2008/0114986 A1 * | 5/2008 | Morris et al. | 713/183 |
| 2008/0115223 A1 * | 5/2008 | Morris et al. | 726/27 |
| 2009/0041240 A1 * | 2/2009 | Parkvall et al. | 380/247 |

FOREIGN PATENT DOCUMENTS

| | | |
|---|---|---|
| WO | WO-03073242 A1 | 9/2003 |

\* cited by examiner

TECHNIQUES FOR SECURING ELECTRONIC IDENTITIES

FIELD OF THE INVENTION

The present invention relates to network security and in particular to securing electronic identities during access attempts to services.

BACKGROUND OF THE INVENTION

Preserving identity information in today's highly-connected computing environments is a challenging task. As electronic commerce becomes more and more pervasive, individuals are transmitting confidential information over the Internet with ever increasing frequency. As a result, identity theft has become commonplace, and organizations are continuously attempting to fill security holes as security lapses become apparent to them.

Most techniques for preserving identity focus on preserving a sender's identity over an insecure network, such as the Internet. With these techniques, secure communications are often used with protocols such as Secure Sockets Layer (SSL). The primary concern of the industry has been to ensure that identity information is securely transmitted from a sender to a secure server. The assumption is that once identity information is safely and securely transmitted from a sender to a secure server, then confidentiality and security can be safely preserved. However, this assumes that the secure server is operating behind a firewall and that individuals with access behind that firewall are acting ethically and not attempting to comprise a sender's identity information. Unfortunately, organizations are learning that often security breaches are occurring within their own secure environments because not all employees of the organizations are trustworthy.

The assumption is that security can be relaxed behind a secure firewall because outside intruders cannot comprise a sender's identity information within the firewall. As a result, behind the firewall a sender's security information is frequently transmitted and placed on transmission lines with little or no security. Thus, the security information can be acquired with relative ease by malicious internal users working behind the firewall.

For example, consider an organization offering several services over the Internet, where access to those services is externally controlled by a proxy server acting as a filtering proxy or as a secure authentication mechanism. These services may also include additional external subscription services which manage and provide access to the native service via the subscription services. A sender may use a World-Wide Web (WWW) browser to request access to a particular service behind the firewall. The request is transmitted with sender identity information over the Internet using a Hyper Text Mark-up Language having a Secure Sockets Layer protocol (HTTPS). The identity information permits the proxy server and the desired service to authenticate the sender for access to the service. The proxy server has access to the service via a secure network, such as an Intranet. Once the proxy server authenticates the sender, the sender's identity information and request are forwarded within the secure network to the desired service for servicing.

During this forward process, the sender's identity information is vulnerable within the secure network and can be intercepted by individuals having access to the secure network. This means that the organization maintaining the services must rely on the integrity of its employees to prevent identity theft. In many situations this may be sufficient, but it only takes one misread or disgruntled employee to comprise a sender's integrity. Moreover, once identity theft has occurred, the damage to an organization's customer which results can cause irreparably injury to the organization's reputation and resources.

Therefore, there exists a need for improved techniques that more securely distribute and manage electronic identities within a network.

SUMMARY OF THE INVENTION

In various embodiments of this invention, novel techniques for generating and managing temporarily assigned identity information are taught. Requests for services are authenticated using identity information associated with the requests. Configuration identity information is generated based in part on the identity information. The configuration identity information is further used for generating temporarily assigned identity information. The temporarily assigned identity information is updated to a protected identity directory (can also be an identity data store). Next, the temporarily assigned identity information and the requests are sent to the services on behalf of the requesters. The services access the protected identity directory with the temporarily assigned identity information for purpose of authenticating the requests. The temporarily assigned identity information is associated with the authenticated identity, and the services use the temporarily assigned identity information as if it were the authenticated identity. There are no changes to the services which are required to use the temporarily assigned identity information.

More specifically and in one embodiment of the invention, a method for generating temporarily assigned identity information is presented. Identity information is authenticated. The identity information is associated with a request that is received from a requestor who desires access to a service. Temporarily assigned identity information is generated for the requestor. The temporarily assigned identity information is updated to a protected identity directory. Next, the request and the temporarily assigned identity information are transmitted to the service on behalf of the requestor. The service accesses the protected identity directory with the temporarily assigned identity information for authenticating the requestor for access.

In another embodiment of the present invention, another method for generating temporarily assigned identity information is provided. A request for a service is acquired and authenticated. An identity configuration for the request is compiled. Moreover, temporarily assigned identity information is generated for the request using the identity configuration. The temporarily assigned identity information and the request are transmitted to the service.

In still another embodiment of the present invention, an identity information management system is described. The identity information management system includes a proxy server, a local identity mapping store, and a protected identity directory. The proxy server intercepts requests made for services, where the requests are associated with requestors. The local identity mapping store houses mappings between temporarily assigned identity information and identity configurations, both of which are generated by the proxy server from identity information provided with the requests. The proxy server updates the protected identity directory with the temporarily assigned identity information, and the proxy server transmits the temporarily assigned identity information and the requests to the services. The services use the temporarily assigned identity information for accessing the protected identity directory in order to authenticate the requests.

In yet another embodiment of the present invention, a data store is provided for managing identity information. The data store includes identity configuration information, temporarily assigned identity information, and a mapping. A proxy server generates the identity configuration information in response to a request made from a requestor for a service. Further, the proxy server generates the temporarily assigned identity information using at least a portion of the identity configuration. The mapping links the identity configuration with the temporarily assigned identity information. The proxy server accesses the mapping for transmitting the temporarily assigned identity information along with the request to the service on behalf of the requester.

DETAILED DESCRIPTION OF THE INVENTION

Figure 1:
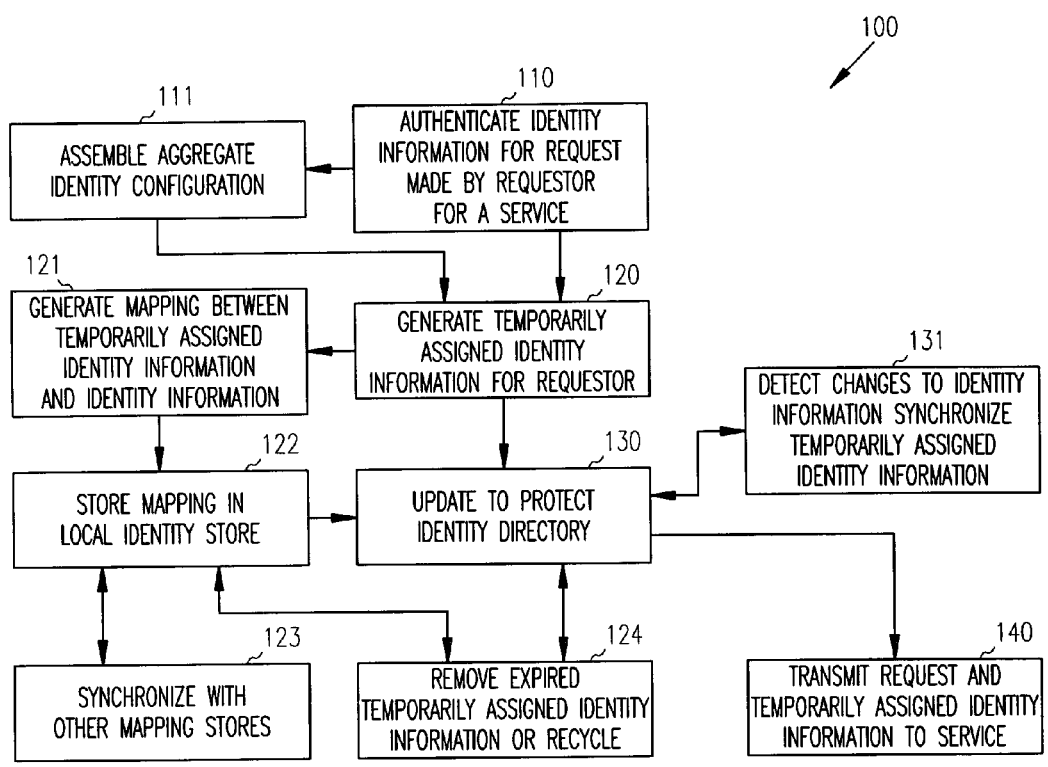
FIG. 1 is a flowchart representing a method for generating temporarily assigned identity information.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of this invention. The following description is, therefore, not to be taken in a limited sense, and the scope of the invention is defined by the appended claims.

As used herein a "sender" and "requester" are used synonymously with one another. A requestor can be an end-user or an automated service that issues an electronic request for a service over a network. As an example, a requestor can be an end-user accessing a World-Wide Web (WWW) browser to activate links associated with an existing service. Furthermore, access to the service requires authentication, therefore the request includes identity information for the requestor. Identity information includes electronic data that is typically used for authenticating a requestor. Identity information can include electronic identifications (e.g., user identity, application identity), electronic passwords, digital certificates, encrypted tokens, biometric data, digital signatures, hardware values, network values, time of day values, calendar values, and the like.

The identity information, if compromised, can be used to acquire a variety of other confidential information associated with a requestor, such as Social Security Numbers (SSNs), password hints, credit card numbers, bank account numbers, home address, phone numbers, and the like. This is so because once the electronic identity of the requestor is compromised other services that use the electronic identity can be accessed to acquire the additional confidential information. The other services have no way of distinguishing between a legitimate request made by a legitimate requestor from an illegitimate request made from a bogus requester because the services authenticate requests using the identity information of the requesters. Thus, if the identity information is compromised all confidential information associated with that requestor's identity is potentially compromised.

As used herein a "service" can include any electronic application, collection of applications, or systems that operate within a secure network behind a firewall. Access to the service requires identity information for a requestor; the identity information is used to authenticate a request or requestor for accessing the service. A requestor indirectly issues requests to the service through an additional service, such as a proxy server acting as a firewall. Moreover, the service has access to one or more protected identity directories that permit the service to use any received identity information to properly authenticate a request or requester. The protected identity directory is accessible to the service, the proxy server, or other services within the secure network. Moreover, the protected identity directory can be one or more directories interfaced together, one or more data stores interfaced together, or a combination of directories and data stores interfaced together.

In one embodiment of the invention, the techniques presented herein for securing electronic identities are at least partially implemented within an identity proxy server, such as iChain or Excelerator, distributed by Novell, Inc. of Provo, Utah. The proxy server acts as a firewall to desired services and accepts requests originating from an insecure network for those services. With the teachings of this invention, there is no need to make modifications to any of the services; rather, the proxy server manages identity information associated with requests that are made for those services. Correspondingly, any legacy or existing services that requires identity information for authenticating requests can benefit and easily integrate with the techniques presented herein.

FIG. 1 is a flowchart representing one method 100 for generating temporarily assigned identity information. The processing of the method 100 is implemented in a computer accessible medium, and in one embodiment is implemented as one or more services processing on a proxy server. Further, the proxy server acts as a firewall for a secure network.

Initially, a requestor makes a request for a service via an insecure network. The service is accessible from within a secure network; however, the service does not directly receive the request from an insecure network. In other words, the request originates from an insecure network, such as the Internet, and the request is acquired by the processing of the method 100 and preprocessed in the manner described below before it is properly processed by the service. Moreover, the request includes identity information associated with the requestor. The identity information can include a password, an electronic identification for the requester, a certificate, a signature, a token, a hardware value, a network value (configuration value), a time of day value, a calendar value, a biometric value, or other values that may be used to authenticate an identity of the requestor. Moreover, the identity information can include a combination of one or more of the values described above.

Accordingly, at 110, the processing of the method 100 acquires a request for a desired service and strips out the identity information; the identity information is used for authenticating an identity of the requestor, which will thereby authenticate the request and the requester. If the request is properly authenticated, then, optionally, at 111, an aggregate identity configuration for the requestor is assembled. Acquisition of the request can occur by the desired service transmitting the request to the processing of the method 100. Alternatively, acquisition of the request can occur by a service or proxy that authenticates the identity of the requestor on behalf of the desired service by intercepting the request, or by otherwise acting as an intermediary between the requestor and the desired service.

In one embodiment, the aggregate identity configuration is formed as an electronic identity object for the requestor from an authoritative identity store and an identity configuration policy specification. The authoritative identity store permits the processing of the method 100 to authenticate the requester (i.e., identity of the requester) and acquire other identity information about the requestor. The identity configuration policy specification defines available policies and attributes associated with the requestor's access levels and permissions within the secure network. These policies and attributes form an aggregated identity configuration for the requestor. Some of these policies and attributes may be germane to the request being processed and some can be germane to other requests that the requestor may make at some future point in time. The aggregate identity configuration forms an electronic identity object for the requestor within the secure network. Furthermore, in some embodiments, there can be more than one authoritative identity store which is used by the processing of the method 100 in forming the requestor's electronic identity object. Additionally, some additional information about the requestor can be acquired from the requestor's computing environment and aggregated within the identity configuration.

At 120, temporarily assigned identity information is generated for use with the received request and the requestor. The temporarily assigned identity information conforms to syntaxes and semantics that are expected by the desired service. The temporarily assigned identity information is used to impersonate the requestor during proxy and service interactions. Moreover, the temporarily assigned identity information is unique to a particular request, but the memory or storage that it occupies can be recycled for other requests and requesters, when a particular request that is being processed in the secure network expires. This is advantageous, because creating new storage locations within data stores (if any are used) can be expensive in terms of processing delay needed to re-create storage locations. Additionally, clean-up operations would typically need to be processed to free up storage previously occupied by no longer active temporarily assigned identity information values. Thus, in some embodiments recycling or reusing the storage occupied by inactive temporarily assigned identity information values provides added benefits with the invention.

Furthermore, the temporarily assigned identity information can be in whole or in part randomly generated. In other embodiments the temporarily assigned identity information is deterministically generated, such as by using memory addresses, hash values, table index values, or combinations of values that generate a key which is used for temporarily impersonating the requestor's identity. In still further embodiments, the temporarily assigned identity information can be a subset of the original identity information associated with the requestor, where the subset reflects only those portions of the original identity information which may be needed by the desired service in processing the request.

In one embodiment, at 121, the temporarily assigned identity information, the originally received identity information, and the electronic identity object of the requestor are associated or mapped to one another. Further, at 122, this mapping is maintained in a local identity store which is accessible only to the processing of the method 100. In this way a plurality of temporarily assigned identity information can be managed for a plurality of requests and requestors, where some requests are associated with the same requestor and other requests are associated with a different requester. Moreover, some requests can be made for purposes of accessing the same service or for purposes of accessing a different service located within the secure network. In still other embodiments the mapping can also be temporarily housed within a cache accessible to the processing of the method 100.

Additionally, in some embodiments, there are multiple local identity stores, where each local identity store is associated with the same or a separate processing instance of the method 100 within the secure network. In these embodiments, at 123, the mappings can be synchronized with one another within the secure environment.

Moreover, the temporarily assigned information or the electronic identity object(s) can be removed proactively by the processing of the method 100 at 124 when a terminating event is detected. For example, the processing of the method 100 can be configured such that when all outstanding requests for a particular user have been terminated then the mappings are deleted from the local identity store, the protected identity directory, and cache (as the case may be).

As an example, suppose a particular requestor was issuing two requests from a single browser over the Internet for two separate services accessible within the secure network. Suppose further that the requester terminates his browser and this event is detected by the processing of the method 100. In this situation, since the requester has no active requests the mappings to temporarily assigned identity information are immediately removed from the local identity store and a protected identity directory, which is used by the services for authenticating the requests. In another example, suppose the requestor had two separate browsers processing, one browser for each separate request, and that the requester terminates only one of the browsers. In this situation, the mapping for the requestor can remain unchanged and active within the local identity store and the protected identity directory.

The previous example presupposes that a temporarily assigned identity information value is shared between two separate sessions (e.g., via the two browsers). Alternatively, if each browser uses a different temporarily assigned identity information value for the requester, which both map to the same authenticated identity of the requestor, then one of the different temporarily assigned identity information values can be removed from one of the local identity stores.

Once the temporarily assigned identity information and the mapping to the requestor are generated, the temporarily assigned identity information is updated to a protected identity directory at 130. The protected identity directory can reside entirely within volatile storage (e.g., memory), reside entirely within non-volatile storage, or reside within a combination of volatile and non-volatile storages. Additionally, the protected identity directory can be one or more data stores, one or more directories, or a combination of data stores and directories synchronized with one another.

In some embodiments, the electronic identity object created for the requestor is also updated to the protected identity directory. In other embodiments, only the temporarily assigned identity information is updated to the protected identity directory and associated with an existing requestor identity object. In some embodiments, there may be more than one protected identity directory that synchronize with one another, such that when one protected identity directory alters its identity information or temporarily assigned identity information for a requester the modifications are communicated and synchronized with the other protected identity directories. Furthermore, in one embodiment, a first protected identity directory may house only the temporarily assigned identity information while a second protected identity directory house the original identity information associated with the temporarily assigned identity information. In these embodiments, access to the first protected identity directory with the temporarily assigned identity information can be augmented with the mappings to access the original identity information housed in the second protected identity directory.

The service associated with the original request and the processing of the method 100 are the entities that can access the protected identity directory. The service accesses the protected identity directory for purposes of authenticating a request or requestor (i.e., identity of the requestor) for access. The processing of the method 100 accesses the protected identity directory for purposes of linking the requestor (requester identity object) with the temporarily assigned identity information.

In one embodiment, the temporarily assigned identity information is a temporarily assigned and temporary password associated with an electronic identification for the requestor. In other embodiments, the temporarily assigned identity information is a temporarily assigned electronic identification and password associated with the requestor. Moreover, in some embodiments, the protected identity directory can be configured to send events when dynamic changes are made to identity information associated with the requestor. In these situations, at 131, the temporarily assigned identity information, the electronic identity object, and the mapping can be automatically adjusted as needed by the processing of the method 100. Moreover, in some embodiments, the detected changes to the identity information can be automatically updated to one or more authoritative identity stores or logged such that the changes can be subsequently updated to one or more authoritative identity stores.

Next, the processing of the method 100, at 140, transmits the temporarily assigned identity information and the originally received request to the service. This transmission occurs when the desired service asks for requestor authentication. The service uses the temporarily assigned identity information for authenticating the request or the requestor for access to that service via the protected identity directory. In doing this, the service accesses the protected identity directory with the temporarily assigned identity information to acquire the requestor's electronic access policies and attributes. In some cases the processing of the method 100 generates these policies and attributes as an electronic identity object (aggregate identity configuration) and updates them to the protected identity directory with the temporarily assigned identity information. In other cases, these policies and attributes are pre-existing within the protected identity directory and embodied as a requestor access object (requestor identity configuration).

In some embodiments, the original provided identity information and the temporarily assigned generated identity information are all that is needed by the processing of the method 100 to secure the identity of the requester. In these embodiments, the mapping housed in the local identity store includes the association between the identity information and the temporarily assigned identity information, the protected identity directory is updated with the association such that when the service provides the temporarily assigned identity information to the protected identity directory it is accepted as if it were the original identity information that was provided with the request from the requestor. Thus, in some embodiments, there is no need to manage aggregate identity configurations (electronic identity objects) for the requestor and those identity configurations can be managed with pre-existing techniques.

The service cannot authenticate a request without the temporarily assigned identity information, and the processing of the method 100 controls the generation and termination of the temporarily assigned identity information. In this way, any malicious user located within the secure network can only acquire the temporarily assigned identity information, but this information is temporary and wholly controlled by the processing of the method 100. Thus, malicious users will find that the intercepted temporarily assigned identity information has a severely circumscribed use, which is specific to only one service. Moreover, the service that consumes the temporarily assigned identity information may be configured to detect and deny multiple login events. Thus, malicious users will find that the temporarily assigned identity information is nearly useless to them and in some instances entirely useless to them. In this way, confidential information associated with a requestor is more securely managed and transmitted within a secure network, since a requestor's identity information is not transmitted to the service within the secure network; rather only temporarily assigned and temporary identity information is transmitted to the service.

Figure 2:
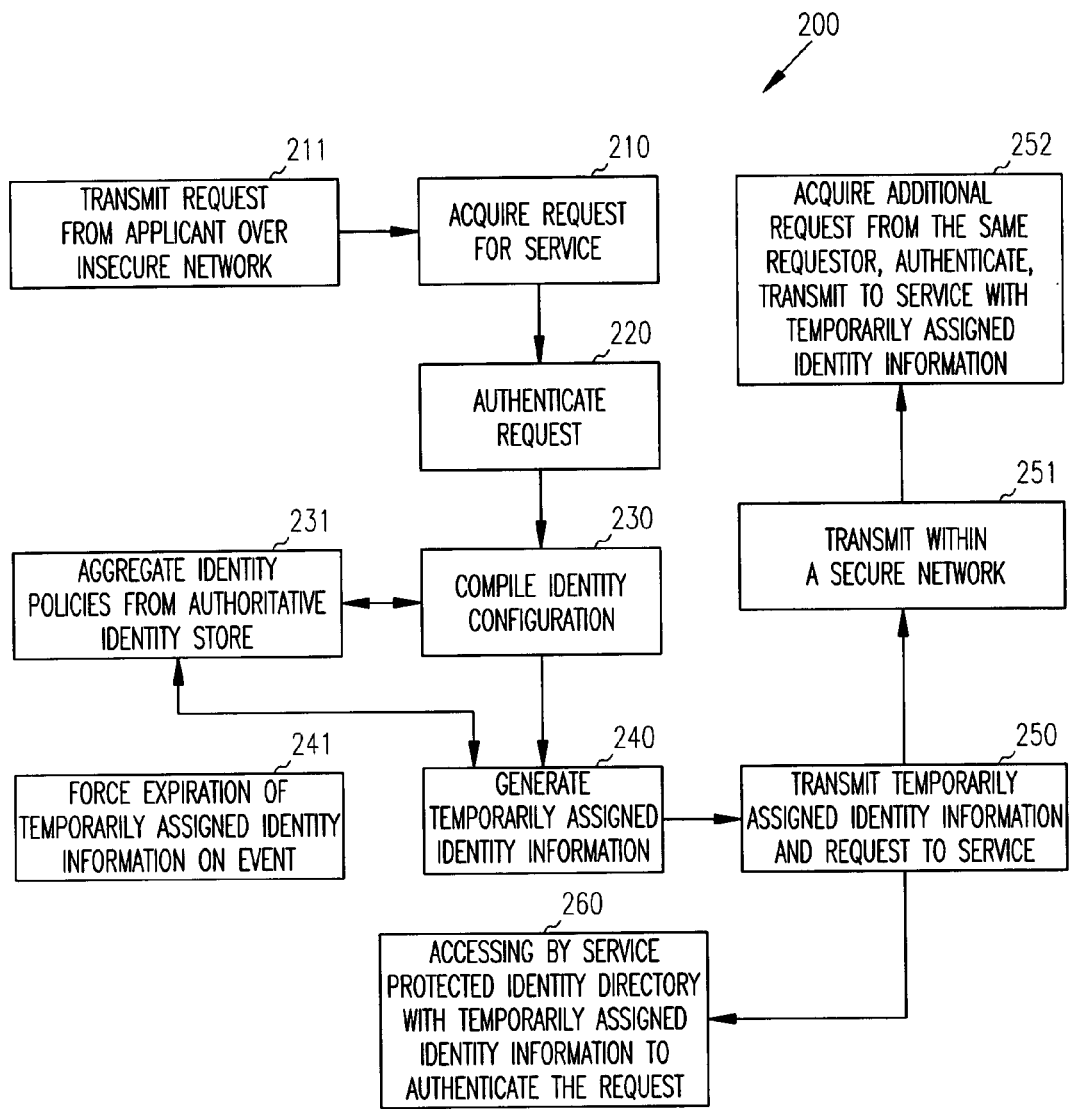
FIG. 2 is a flowchart representing another method for generating temporarily assigned identity information.

FIG. 2 is a flowchart representing another method 200 for generating temporarily assigned identity information. The processing of the method 200 is implemented and accessible from a computer-accessible medium. In one embodiment, the processing of the method 200 is implemented as one or more services within a proxy server.

Initially, a request for a service is acquired at 210. The request includes identity information associated with a requestor of the request. In one embodiment, the request originates from a service over an insecure network at 211. For example, an end-user (requestor) uses a WWW browser (browser service) to activate a Uniform Resource Locator (URL) link within a browser page. The URL link is a request for a service located within a secure network, and when accessed cookies that are associated with the requestor are attached to the request and transmitted over the Internet (insecure network). A proxy server that proxies for the service and that embodies the processing of the method 200 intercepts the request and performs the processing described below.

Initially, the request is parsed to obtain the identity information associated with the requestor of the request. At 220, that identity information is used for authenticating the request (i.e., via authenticating an identity of the requestor) for access to the secure network and ultimately the desired service associated with the request. This can be achieved by using the identity information to access one or more authoritative data stores. Once the request and requestor are authenticated, then access policies and attributes associated with the requestor are obtainable.

Accordingly, at 230, an identity configuration for the requestor is compiled at 230. This identity configuration can be an aggregate access configuration based on aggregating identity policies and attributes that are available from the one or more authoritative identity stores, as depicted at 231. In some additional embodiments, the identity configuration can also include additional information about the requestor that is obtained from the requestor's computing environments, such as hardware configuration, network configuration, or other personal information that may be accessible to the processing of the method 200 (e.g., via cookies and the like). The identity configuration serves as an electronic identity object for the requestor associated with the request.

At 240, temporarily assigned identity information is generated for the request. The temporarily assigned identity information is a temporary identification and password, or a temporary password that is supplied to the desired service to process the initially acquired request. The storage space associated with temporarily assigned identity information can be recycled and used with other requests, at 241. Temporarily assigned identity information can be forced to expire based on detection of event that indicates a particular requester is not longer logged into or in communication with the processing of the method 200.

The identity configuration and the temporarily assigned identity information are updated to a protected identity directory. The desired services access the protected identity directory when a request is received for purposes of authenticating the request or requestor (i.e., true identity of requester) and for purposes of acquiring the appropriate access policies and attributes that are to be given to the requestor. In one embodiment, only the mapping between the temporarily assigned identity information and the original received identity information are updated to the protected identity directory. In these embodiments, the access policies and attributes associated with the requestor need not be managed by the processing of the method 200.

Once the protected identity directory is updated, at 250, the request and the temporarily assigned identity information is transmitted to the desired service for processing. In one embodiment, the transmission occurs via a secure network at 251. Moreover, at this time, should any malicious user attempt to compromise the electronic identity of the requestor, all that is available to the malicious user is the temporarily assigned identity information, since the original provided identity information remains secure and is not placed on the wire within the network, such that it may be compromised. This is a significant improvement over conventional techniques that rely on the integrity of users within the secure network to maintain the secrecy of a requestor's electronic identity.

In still other embodiments, the method 200 can be processed for multiple iterations associated with additional requests for services from the same requester, as depicted at 252. In this way, a requester can issue multiple requests for disparate services that are accessed via the secure network. In such embodiments, the new requests are authenticated and it is determined that an existing authenticated request already exists and includes temporarily assigned identity information. Thus, the new request is associated with the existing temporarily assigned identity information and no update to the protected identity directory need occur. The new request is associated with the temporarily assigned identity information and transmitted to the new service that is being requested.

At 260, the service that receives the request and the temporarily assigned identity information accesses the protected identity directory for purposes of authenticating the request or requestor and for purposes of acquiring the appropriate access policies and attributes associated with the requestor of the request. In some embodiments, the appropriate access policies and attributes are defined in the compiled identity configuration that was aggregated by the processing of the method 200. In other embodiments, the appropriate access policies and attributes are pre-existing within the protected identity directory but uniquely associated with the temporarily assigned identity information which was updated by the processing of the method 200.

The embodiments of the method 200 eliminate the need to transmit a requestor's electronic identity information within a secure network, where such information may be compromised by a malicious user that has legitimate or illegitimate access to the secure network. Furthermore, the embodiments of the method 200 permit temporarily assigned identity information to be temporary for improved security, and the temporarily assigned identity information can be recycled within the secure network.

It should also be noted that in some embodiments, the period during which temporarily assigned identity information can remain valid for processing iterations of the method 200 can be configurable. That is, rules can be selectively implemented for determining when and if temporarily assigned identity information is removed from the protected directory store. Moreover, in some embodiments, the temporarily assigned identity information can be replicated within one or more directories from the protected identity on a temporary basis. This replication and removal can also be configured based on the desired needs of the network.

Figure 3:
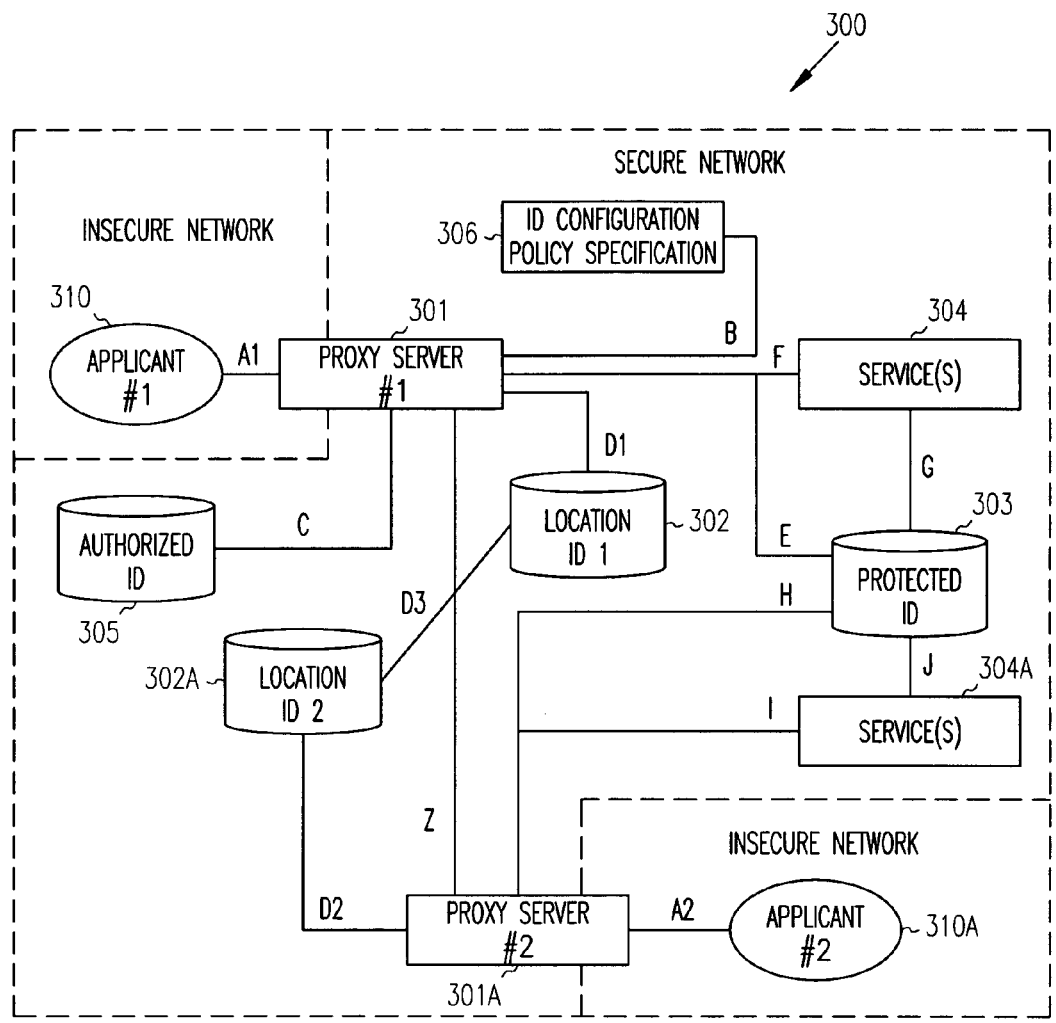
FIG. 3 is a diagram of an identity information management system.

FIG. 3 is a diagram of an identity information management system 300. The identity information management system 300 is implemented in a computer-accessible medium and is accessible from insecure networks and further includes a portion of processing and services that reside in a secure network. In one embodiment, the identity information management system 300 serves as a firewall or other secure authentication mechanism for a secure network.

The identity information management system 300 includes at least one proxy server 301, at least one local identity mapping store 302, and a protected identity directory 303. The proxy server 301 is accessible to a service 310 that is accessible over an insecure network.

During operation of the identity information management system 300, a service 310 issues a request via the insecure network via communication line A1. In some embodiments, A1 is an HTTPS communication originated from a service 310 that is a WWW browser over an insecure network which is the Internet. The request is directed to a service 304 located within the secure network. Moreover, the request can directly or indirectly include identity information associated with the requestor of the request. The identity information can include an electronic identification (e.g., user identity or application identity), a password, a certificate, a token, a hardware value, a network configuration value, a time of day value, a calendar value, a biometric value, or a combination of the above-mentioned values that permits the service 304 and the proxy server 301 to authenticate the request or requestor (i.e. identity of the requestor) for access to the service 304.

Access to the service 304 can only be made via A1, such that the proxy server 301 effectively intercepts the request on behalf of the requestor and then processes the request within the secure environment to the service 304. When the request is initially intercepted, the identity information is authenticated and an identity configuration specification 306 and one or more authoritative identity stores 305 are consulted via communication links B and C, respectively, for purposes of aggregating an identity configuration for the requestor of the request. The identity configuration includes access policies and attributes that are permissible for the requestor within the secure environment.

Once the identity configuration is aggregated or compiled, the proxy server 301 or another service generates temporarily assigned identity information for the request and requester. The temporarily assigned identity information and the identity configuration are associated with one another within a local identity mapping store 302 via communication link D1. In one embodiment, and for purposes of improved security, the local identity mapping store 302 is only accessible only to the proxy server 301. In another embodiment, copies of the temporarily assigned identity information and the identity configuration are maintained and managed in a cache accessible to the system 300.

Next, the proxy server 301 or another service updates the protected identity directory 303 via communication link E with the identity configuration and the temporarily assigned identity information. Then, when the desired service 304 indicates that it needs to authenticate the requester, the proxy server 301 transmits the temporarily assigned identity information to the desired service 304 via communication link F. In another embodiment, the original intercepted request and the temporarily assigned identity information are sent by the proxy server 304 via communication link F to the service before the desired service 304 indicates that it needs to authenticate the requestor for a request. Upon receiving the temporarily assigned identity information, the service 304 accesses the protected identity directory 303 via communication link G, where the temporarily assigned identity information authenticates the request and access is granted to the service 304, where the access conforms to the access policies and attributes that are defined in the identity configuration.

In alternative embodiments, the proxy server 301 or another service does not need to aggregate identity configurations; rather, the proxy server 301 or other service associates the temporarily assigned information with the originally provided identity information supplied with the original request in the local identity mapping store 302. Then, via E this mapping is updated in the protected identity directory 303, such that when the service 304 attempts to authenticate the request via G, the temporarily assigned identity information automatically translates as if it were the identity information and access policies and attributes are properly acquired by the service 304 from the protected identity directory 303.

Additionally, proxy server 301 or a managing service manages the temporarily assigned identity information, the identity configurations, and the associated mappings within the secure network. In this way, the proxy server 301 or managing service can remove this information when it determines that removal is necessary. For example, perhaps a requestor no longer has any valid session with the proxy server 301, indicating that the temporarily assigned identity information, the identity configuration, and the mapping associated with the requestor should be removed from the local identity mapping store 302 and the protected identity directory 303.

Additionally, the proxy server 301 or managing service can manage the temporarily assigned identity information, so that storage locations used for housing the temporarily assigned identity information can be recycled for other requests or even other requesters. This permits active and dynamic storage management of the protected identity directory 303 and the local identity store 302.

The identity information management system 300 is not limited in operation to a single proxy server 301 or a single local identity mapping store 302. In this way, the system 300 can cooperate with additional proxy servers, such as proxy server 301A (or for that matter any additional service). During operation of the system 300, proxy server 301A receives a request from a different service 310A via communication link A2, the request again originates over an insecure network. Proxy server 301A communicates directly with proxy server 301 via link Z.

Proxy server 301A operates and processes the received request in a similar manner discussed above with proxy server 301; however, local identity mapping store 302A is synchronized to local identity mapping store 302 via communication link D3. In this way, mappings associated with temporarily assigned identity information and identity configurations are synchronized, such that changes made by one proxy server 301 or 301A are available within both local identity mapping stores 302 and 302A.

In another mode of operation, the proxy server 301A looks up the requestor in the protected identity directory 303 to determine if the requester is already authenticated and if any such authentication is still valid (e.g., not expired or stale). If these conditions are met, then the proxy server 301A uses the protected identity directory 303 to automatically authenticate the requester to the desired service 304A.

In still another mode of operation, the proxy server 301A can update a second protected identity directory (not shown in FIG. 3) with the temporarily assigned identity information housed in the protected identity directory 303. This may be desirable in situations where the desired service 304A is designed to use the second protected identity directory and not the protected identity directory 303 shown in FIG. 3.

Like the description provided above, the proxy server 301A uses communication link H to update, if necessary at all, mappings between temporarily assigned identity information and identity configurations within the protected identity directory 303. Next, the temporarily assigned identity information and the originally received request received from service 310A are transmitted via communication link I to service 304A. Again, this transmission can be delayed until the system 300 receives an authentication request for the requestor, where the authentication request is sent from the service 304A. The service 304A then uses communication link J to authenticate the request or requestor for access to the service using the provided temporarily assigned identity information.

Figure 4:
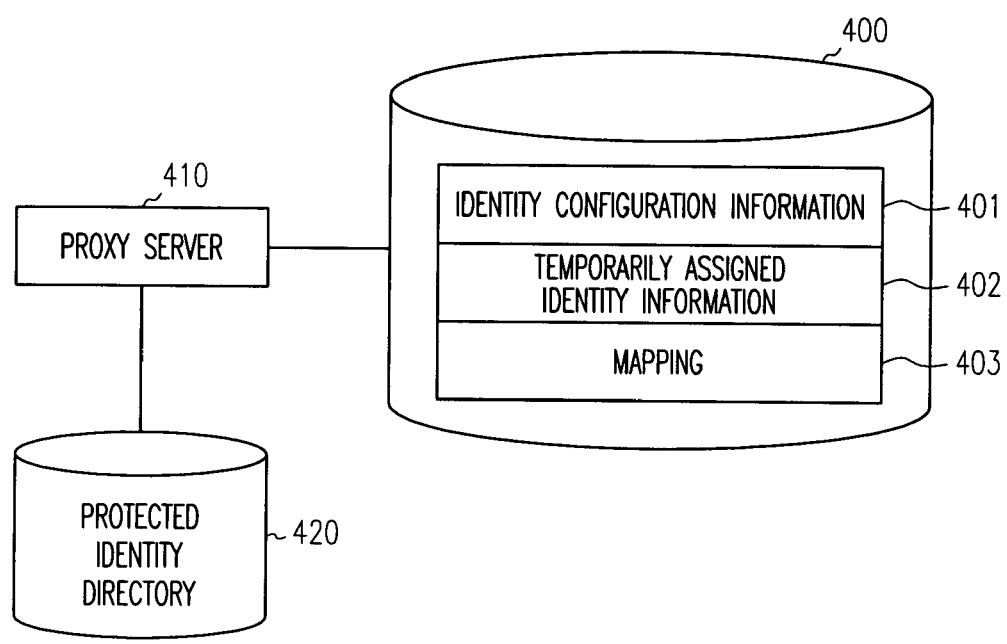
FIG. 4 is a diagram of an identity information data store.

FIG. 4 is a diagram of one identity information data store 400 that resides in a computer-accessible medium and is accessed for purposes of acquiring mappings associated with identity information.

The identity information data store 400 includes identity configuration information 401, temporarily assigned identity information 402 and a mapping 403. The identity configuration information 401 is an aggregated electronic representation of access policies and attributes associated with a requester. A proxy server 410 or other managing service assembles and manages the identity configuration information 401 in response to receiving a request from a requester for access to a service that resides within a secure network. Moreover, the proxy server 410 or managing service uses one or more authoritative identity stores and an identity configuration policy specification in assembling the identity configuration information 401.

The proxy server 410 or managing service also generates the temporarily assigned identity information 402 on behalf of a request associated with identity information for the requestor. The linkage between the identity configuration information 401 and the temporarily assigned identity information 402 is identified as a mapping 403. In another embodiment, one or more authoritative identity stores or other services that provide access to the authoritative identity stores supply the mapping 403.

The proxy server 410 or managing service populates fields of the identity configuration information 401 and temporarily assigned identity information 402, and in response to this the data store 400 maintains and records a mapping for each populated pair of identity configuration information 401 and temporarily assigned identity information 402. This mapping permits the proxy server or managing service to acquire and manage the identity configuration information 401 and the temporarily assigned identity information 402.

The proxy server 410 or managing service consumes the data store 400, in the following manner. A requestor sends a request via an insecure network and the proxy server 410 intercepts the request. The request includes, either directly or indirectly, identity information associated with the requestor. Moreover, the request is directed to a service that resides in a secure network being managed by the proxy server 410 or another managing service. The proxy server 410 or managing service first authenticates the requestor's identity information, and then the proxy server or managing service 410 assembles or compiles an identity configuration value for the requester. The identity configuration value is an electronic object or representation of the requestor and its permitted access policies and attributes.

The proxy server 410 or managing service queries the data store 400 with the identity configuration value to determine if it is pre-existing within the data store. If it is pre-existing then the proxy server 410 or managing service uses the associated mapping value included in the mapping field 403 of the data store 400 for purposes of acquiring a temporarily assigned identity information value from the associated temporarily assigned identity information field 402. Next, the proxy server 410 or managing service transmits the temporarily assigned identity information value and the originally received request to the appropriate service that is needed for processing the request. In some embodiments, this transmission only occurs when the appropriate service indicates that it has a requestor which needs to be authenticated.

If the identity configuration value does not pre-exist in the data store, then the proxy server 410 or managing service creates a new record instance in the data store 400. The new record instance includes an identity configuration value for the identity configuration information field, a temporarily assigned identity information value for the temporarily assigned identity field 402, and a mapping value that links the two fields within the record via the mapping field. The mapping value is automatically generated and maintained by the data store 400. In some embodiments, the new record instance is actually a recycled or reused storage record that was associated with previous and now expired, obliterated, purged, deleted, and expunged information.

Next, the proxy server 410 or managing service updates the newly generated identity configuration information value and the temporarily assigned identity information value to a protected identity directory 420. Then, the proxy server 410 or managing service transmits the original received request and the newly generated temporarily assigned identity information value to the needed service, where the service uses the temporarily assigned identity information value to access the protected identity directory 420 for purposes of authenticating the request or requestor and for purposes of acquiring the identity configuration information value. The identity configuration information value provides the access policies and attributes that are appropriate for the request or requestor.

In some embodiments, more than one data store 400 participates in systems consuming the data stores 400. In each of these embodiments, a single data store 400 is accessible to a single proxy server 410 or managing service; however, the data stores 400 are designed to stay in synchronization with one another via a separate and secure communication link that sends notifications of changes. An example system using more than one data store 400 is described above in detail with the description of FIG. 3 and system 300. Thus, the data store 400 is not directly accessible by the services associated with the requests.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other services in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate embodiment.

What is claimed is:

1. A method for generating temporarily assigned identity information implemented in a computer-readable medium and executed on a proxy service to perform the method, comprising:

authenticating, by a proxy server, identity information associated with a request received from a requestor for accessing a service, the request is sent from the requestor to the service and intercepted for processing;

generating, by a proxy server, temporarily assigned identity information for the requestor, the temporarily assigned identity information is in a syntax and format recognized by the service, and the temporary assigned identity information is unique to each of the requests and expires when the requestor terminates communication sessions associated with the services, and the temporarily assigned identity information includes a combination of, a password, a certificate, a token, a biometric value, a hardware value, a network connection value, and a time value, and the temporarily assigned identity information is used to impersonate the requestors, and the original identity information consists of a first subset, which reflects only those portions of the original identity information needed by the services to process the requests, and a second subset, which reflects all the information in the original identity information excluding the first subset, and the temporary assigned identity information includes the first subset of original identity information for the requestors, and excludes the second subset, updating, by a proxy server, a protected identity directory with the temporarily assigned identity information; and directly transmitting, by a proxy server, the request and the temporarily assigned identity information to the service on behalf of the requestor, the service accesses the protected identity directory with the temporarily assigned identity information to authenticate the requestor for access, and the temporarily assigned identity information is monitored and removed from the protected identity directory and the local identity mapping store when terminating events are detected, and the proxy server detects and denies multiple login events that use the temporary assigned identity information.

2. The method of claim 1 further comprising:

generating, by a proxy server, a mapping between the identity information and the temporarily assigned identity information; and storing, by a proxy server, the mapping in a local identity mapping store.

3. The method of claim 2 further comprising, synchronizing, by a proxy server, the local identity mapping store and the mapping with one or more addition local identity mapping stores.

4. The method of claim 1 wherein the generating further includes assembling an aggregate identity configuration for the requestor from one or more authoritative identity stores before generating the temporarily assigned identity information.

5. The method of claim 1 further comprising, removing, by a proxy server, the temporarily assigned identity information from the protected identity directory after detecting a terminating event that terminates the authenticity of the temporarily assigned identity information.

6. The method of claim 5 further comprising recycling, by a proxy server, a storage space occupied by the temporarily assigned identity information for use in a subsequent iteration of the method.

7. The method of claim 1 further comprising:

detecting, by a proxy server, dynamic changes made on at least a portion of the identity information, wherein the changes are detected within the protected identity directory; and synchronizing, by a proxy server, the temporarily assigned identity information with the changes.

8. The method of claim 1 further comprising:

detecting, by a proxy server, dynamic changes made on at least a portion of the identity information, wherein the changes are detected within the protected identity directory; and synchronizing, by a proxy server, the changes with one or more authoritative identity stores impacted by the changes.

9. The method of claim 1 further comprising:

detecting, by a proxy server, changes made on at least a portion of the identity information, wherein the changes are detected within the protected identity directory; and logging, by a proxy server, the changes for subsequent update with one or more authoritative identity stores impacted by the changes.

10. A method for generating temporarily assigned identity information implemented in a computer-readable medium and executed on a proxy service to perform the method, comprising:

acquiring, by a proxy server, a request for a service from a requestor that makes the request directly to the service;

authenticating, by a proxy server, the request;

compiling, by a proxy server, an identity configuration for the request;

generating, by a proxy server, temporarily assigned identity information for the request using the identity configuration, and wherein the temporarily assigned identity information impersonates a requestor, and the temporary assigned identity information is unique to each of the requests and expires when the requestor terminates communication sessions associated with the services, and the temporarily assigned identity information includes a combination of, a password, a certificate, a token, a biometric value, a hardware value, a network connection value, and a time value, and the original identity information consists of a first subset, which reflects only those portions of the original identity information needed by the services to process the requests, and a second subset, which reflects all the information in the original identity information excluding the first subset, and the temporary assigned identity information includes the first subset of original identity information for the requestors, and excludes the second subset, updating, by a proxy server, a protected identity directory with the temporarily assigned identity information; and directly transmitting, by a proxy server, the temporarily assigned identity information and the request to the service on behalf of the requestor, wherein a mapping between the identity configuration and the temporary assigned identity information is removed from cache when the request expires, and the proxy server detects and denies multiple login events that use the temporary assigned identity information.

11. The method of claim 10 wherein acquiring further includes, transmitting the request, wherein the request originates from a requestor's service over an insecure network.

12. The method of claim 10 wherein the transmitting further includes, transmitting the temporarily assigned identity information and the request to the service within a secure network.

13. The method of claim 10 further comprising accessing, by the service on the proxy server, a protected identity directory to authenticate the request using the temporarily assigned identity information.

14. The method of claim 10 further comprising:

acquiring, by a proxy server, an additional request issued from a same-requestor that is associated with the request, wherein the additional request is for an additional service;

authenticating, by a proxy server, the additional request; and transmitting, by a proxy server, the temporarily assigned identity information and the additional request to the additional service.

15. The method of claim 10 further comprising, forcing, by a proxy server, the temporarily assigned identity information to expire upon detection of a terminating event.

16. The method of claim 10 wherein the compiling further includes aggregating identity policies from one or more authoritative identity stores, wherein the identity policies are associated with the requestor that issued the request for the service.

17. An identity information management system, comprising:

a proxy server that intercepts requests made for services, the requests are associated with requestors, and the requests are made from the requestors directly to the services and are processed by the proxy server;

a local identity mapping store for housing mappings between temporarily assigned identity information and identity configurations, the temporarily assigned identity information and the identity configurations are generated from identity information provided with the requests; and a protected identity directory updated with the temporarily assigned identity information and accessed by the services in order to authenticate the requests, the requests and the temporarily assigned identity information are directly transmitted to the services on behalf of the requestors by the proxy server and the temporarily assigned identity information is in a syntax and semantic format recognized by the services for authenticating access to the services, and the temporary assigned identity information is unique to each of the requests and expires when the requestor terminates communication sessions associated with the services, and the temporarily assigned identity information includes a combination of, a password, a certificate, a token, a biometric value, a hardware value, a network connection value, and a time value, and the temporarily assigned identity information is used to impersonate the requestors, and the original identity information consists of a first subset, which reflects only those portions of the original identity information needed by the services to process the requests, and a second subset, which reflects all the information in the original identity information excluding the first subset, and the temporary assigned identity information includes the first subset of original identity information for the requestors, and excludes the second subset, the temporarily assigned identity information is monitored and removed from the protected identity directory and the local identity mapping store when terminating events are detected, and the proxy server detects and denies multiple login events that use the temporary assigned identity information.

18. The identity information management system of claim 17 further comprising a local identity mapping store synchronizer that synchronizes the mappings in the local identity mapping store with one or more additional local identity mapping stores.

19. The identity information management system of claim 17 wherein the local identity mapping store, the protected identity mapping store, and the services are accessible from a secure network.

20. The identity information management system of claim 17 wherein the identity configurations are generated from one or more authoritative data stores associated with the requestors.

21. The identity information management system of claim 17, wherein the temporarily assigned identity information is randomly or deterministically generated.

22. The identity information management system of claim 17, a storage space associated with the temporarily assigned identity information is recycled or reused.

* * * * *